(12) United States Patent
Price

(10) Patent No.: US 9,095,873 B2
(45) Date of Patent: Aug. 4, 2015

(54) METHOD FOR MAKING COVER FOR SHAFT OF ELECTRONIC THERMOMETER PROBE

(71) Applicant: Covidien LP, Mansfield, MA (US)

(72) Inventor: Jeffrey E. Price, Wildwood, MO (US)

(73) Assignee: Covidien LP, Mansfield, MA (US)

( * ) Notice: Subject to any disclaimer, the term of this patent is extended or adjusted under 35 U.S.C. 154(b) by 0 days.

(21) Appl. No.: 14/033,933

(22) Filed: Sep. 23, 2013

(65) Prior Publication Data

US 2014/0079880 A1 Mar. 20, 2014

Related U.S. Application Data

(62) Division of application No. 12/642,171, filed on Dec. 18, 2009, now Pat. No. 8,540,424.

(51) Int. Cl.
*G01K 1/08* (2006.01)
*B05D 1/00* (2006.01)
*B29C 31/00* (2006.01)

(52) U.S. Cl.
CPC . *B05D 1/00* (2013.01); *B29C 31/00* (2013.01); *G01K 1/083* (2013.01); *G01K 2211/00* (2013.01)

(58) Field of Classification Search
USPC .................................. 374/158, 209
See application file for complete search history.

(56) References Cited

U.S. PATENT DOCUMENTS

| | | |
|---|---|---|
| 2,384,024 A | 9/1945 | Goller |
| 2,897,673 A | 8/1959 | Wylie |
| 3,011,086 A | 11/1961 | Post |
| 3,069,752 A | 12/1962 | Sherning et al. |
| 3,750,471 A | 8/1973 | Bremer |
| 3,785,208 A | 1/1974 | Marsilia et al. |
| 3,929,018 A | 12/1975 | Turner |
| 3,954,507 A | 5/1976 | Carter |
| 4,026,751 A | 5/1977 | Fowler et al. |
| 4,093,193 A | 6/1978 | Cassidy et al. |
| 4,341,992 A | 7/1982 | Goldstein |
| 4,721,533 A | 1/1988 | Phillippi et al. |
| 5,713,667 A | 2/1998 | Alvis et al. |
| 6,147,335 A | 11/2000 | Von Arx et al. |
| 6,169,244 B1 | 1/2001 | Carlos et al. |
| 6,190,038 B1 | 2/2001 | Kita et al. |
| 6,936,653 B2 | 8/2005 | McElrath et al. |
| 6,988,826 B2 | 1/2006 | Zribi et al. |
| 7,530,738 B2 | 5/2009 | Price |
| 7,838,587 B2* | 11/2010 | El Bounia et al. ............ 524/495 |
| 8,033,717 B2 | 10/2011 | Kendall |
| 8,148,276 B2* | 4/2012 | Nejhad et al. ................. 442/172 |
| 2001/0002201 A1 | 5/2001 | Kita et al. |
| 2003/0228083 A1 | 12/2003 | Chen |

(Continued)

OTHER PUBLICATIONS

Office Action issued Jul. 18, 2012 in related U.S. Appl. No. 12/642,171, 10 pages.

(Continued)

*Primary Examiner* — Mirellys Jagan
(74) *Attorney, Agent, or Firm* — Lisa E. Winsor, Esq.

(57) ABSTRACT

A cover for a shaft of an electronic thermometer probe. The cover includes a tubular body having an open end and a closed end opposite the open end. The body defines a cavity sized and shaped to slidably receive the shaft of the electronic thermometer probe. At least a portion of the tubular body is formed from a nanotube composite material including a polymer matrix material and a carbon nanotube filler material.

2 Claims, 4 Drawing Sheets

(56) References Cited

U.S. PATENT DOCUMENTS

| | | | |
|---|---|---|---|
| 2005/0126766 A1 | 6/2005 | Lee et al. | |
| 2005/0129928 A1 | 6/2005 | Lee et al. | |
| 2007/0298669 A1* | 12/2007 | Barrera et al. | 442/198 |
| 2008/0154245 A1 | 6/2008 | Martin | |
| 2011/0245378 A1* | 10/2011 | Russ et al. | 523/440 |
| 2013/0216390 A1* | 8/2013 | Younes et al. | 416/241 R |
| 2013/0256605 A1* | 10/2013 | Younes et al. | 252/511 |
| 2014/0213729 A1* | 7/2014 | Hongo | 525/122 |

OTHER PUBLICATIONS

Response filed Nov. 14, 2012 to Office Action dated Jul. 18, 2012 in related U.S. Appl. No. 12/642,171, 6 pages.
Office Action issued Jan. 11, 2013 in related U.S. Appl. No. 12/642,171, 9 pages.
Response filed Apr. 9, 2013 to Office Action dated Jan. 11, 2013 in related U.S. Appl. No. 12/642,171, 7 pages.
Office Action issued Apr. 18, 2013 in related U.S. Appl. No. 12/642,171, 9 pages.
Response filed Jun. 18, 2013 to Office Action dated Apr. 18, 2013 in related U.S. Appl. No. 12/642,171, 4 pages.
IP Australia, Application No. AU 2010241441 Patent Examination Report No. 1, dated Jul. 17, 2013, 4 pages, Australia.
IP Australia, Application No. AU 2010241441 Response to Patent Examination Report No. 1, dated Nov. 12, 2013, 5 pages, Australia.
Patent Examination Report No. 1 in related Australian application 2013251231 dated Dec. 5, 2014, 3 pages.
Response dated Apr. 21, 2015 to Australian Patent Examination Report No. 1 in related Australian application 2013251231 dated Dec. 5, 2014, 7 pages.

* cited by examiner

METHOD FOR MAKING COVER FOR SHAFT OF ELECTRONIC THERMOMETER PROBE

CROSS REFERENCE TO RELATED APPLICATION

This Application is a divisional of co-pending U.S. patent application Ser. No. 12/642,171 filed on Dec. 18, 2009, and entitled, "Cover for Shaft of Electronic Thermometer Probe", which is hereby incorporated by reference in its entirety.

FIELD OF THE INVENTION

The present invention generally relates to a cover for a shaft of an electronic thermometer probe.

BACKGROUND

Electronic thermometers are widely used in the healthcare field for measuring a patient's body temperature. Typical electronic thermometers have a probe comprising an elongate shaft. Electronic temperature sensors such as thermistors or other temperature sensitive elements are contained in the shaft. In one version, the probe includes a cup-shaped aluminum tip at its free end. A thermistor is placed in thermal communication with the aluminum tip inside the probe. When a free end of the probe is placed, for example, in a patient's mouth, the tip is heated up by the patient's body and the thermistor measures the temperature of the tip. Additional electronics connected to the electronic sensor components may be contained in a base unit connected by wire to the shaft or may be contained n a handle of the shaft, for example. Electronic components receive input from the sensor components to compute the patient's temperature. The temperature is then typically displayed on a visual output device such as a seven segment numerical display device.

Disposable, removable covers for the shaft of the probe are used for hygienic purposes so the probe does not have to be cleaned and disinfected after each use. Instead, after each use of the electronic thermometer the probe cover is removed from the probe shaft and discarded, and before a subsequent use, a new clean probe cover is received on the probe. Conventionally, probe covers are made of plastic, such as a high density polyethylene (HDPE). However, the thermal conductivity of plastic is very low (0.1-0.5 W/m° C.), which can cause inefficiency in the speed and inaccuracy of the measurements taken by the thermometer. To compensate for the low conductivity of plastic, probe covers may be filled with higher conductivity materials such as aluminum and silicon oxides (1-6 W/m° C.). More recently boron nitride has been used due to its even higher conductivity (10-50 W/m° C.). Alternatively, the plastic can also be loaded with carbon black and graphite fibers (25-470 W/m° C.). However, the loading required to provide the necessary conductivity is typically high. This results in heavy parts and degraded structural properties of the plastic.

SUMMARY

In one aspect, the present invention includes a cover for a shaft of an electronic thermometer probe comprising a tubular body having an open end and a closed end opposite the open end. The body defines a cavity sized and shaped to slidably receive the shaft of the electronic thermometer probe therein. At least a portion of the tubular body being formed from a nanotube composite material comprises a polymer matrix material and a carbon nanotube filler material.

In another aspect, the present invention includes a method of making a cover for a shaft of an electronic thermometer probe comprising preparing a polymer resin and introducing carbon nanotubes into the polymer resin. The nanotubes and polymer resin are mixed to generally evenly disperse the nanotubes in the resin. The mixed resin and nanotubes are molded and cured.

In still another aspect, the present invention includes a cover for a shaft of an electronic thermometer probe comprising a tubular body having an open end and a closed end opposite the open end. The body defines a cavity sized and shaped to slidably receive the shaft of the electronic thermometer probe therein. At least a portion of the tubular body is formed from a polymer material coated with graphite.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DRAWINGS

Figure 2:
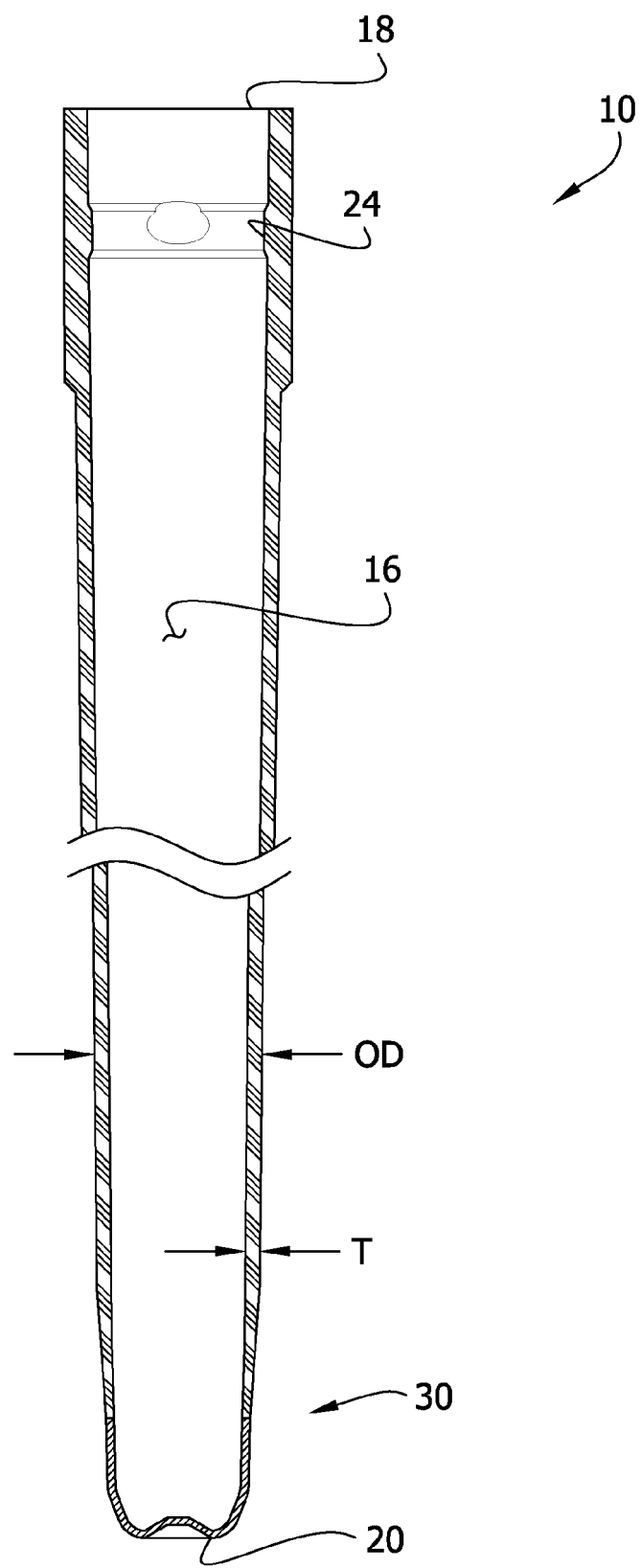
FIG. 2 is a longitudinal section of a first embodiment of the probe cover.
Figure 3:
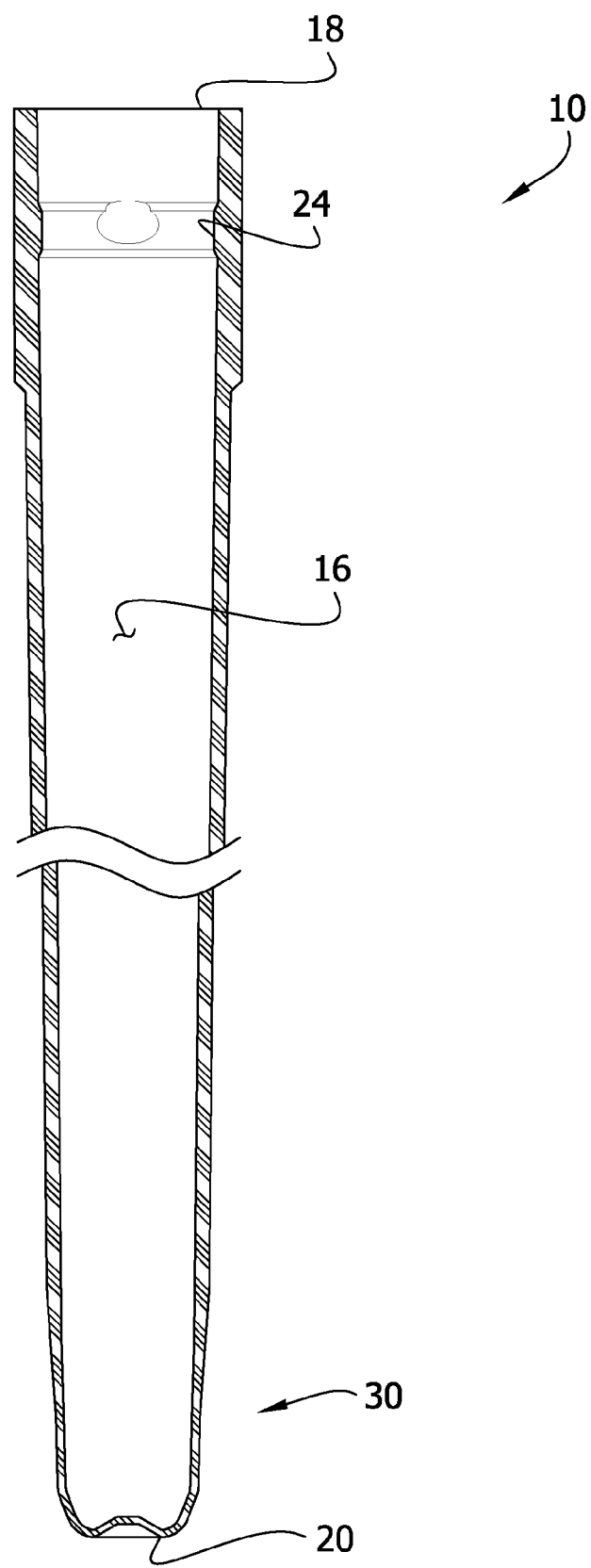
FIG. 3 is a longitudinal section of a second embodiment of the probe cover.
Figure 4:
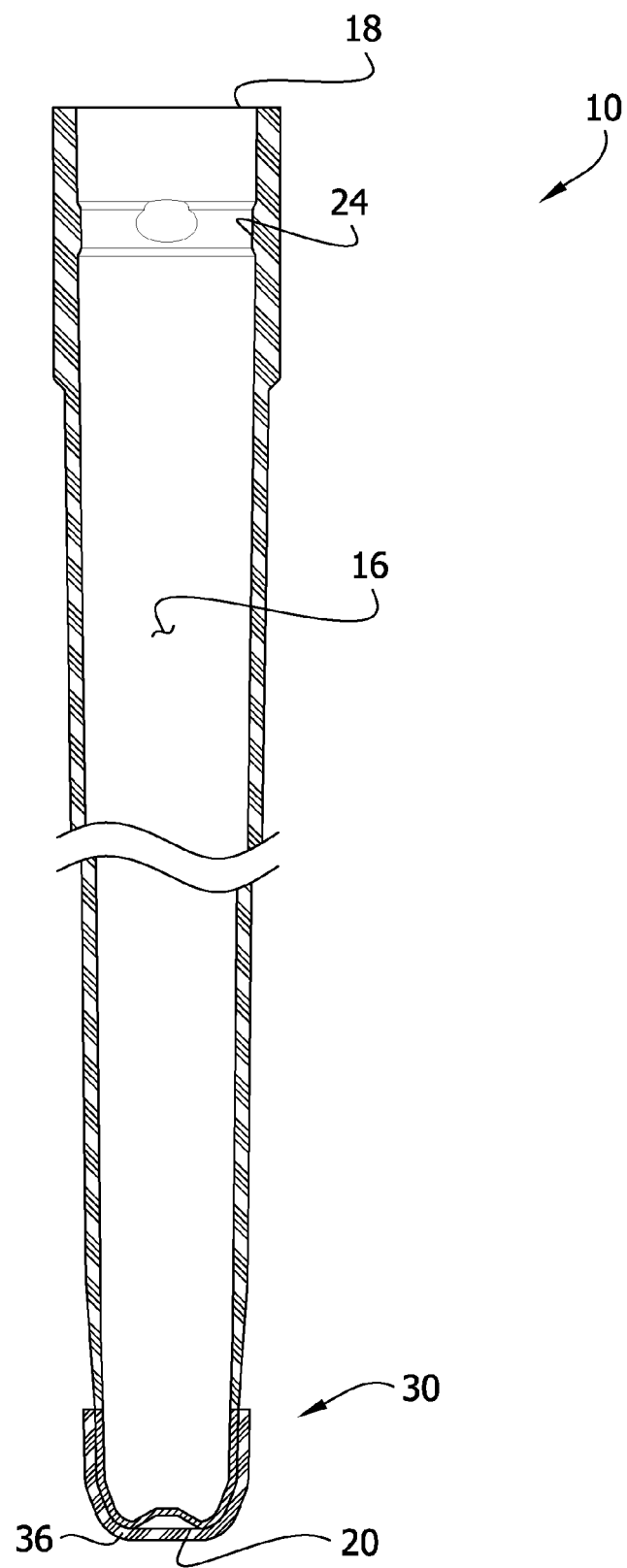
FIG. 4 is a longitudinal section of a third embodiment of the probe cover.

Referring now to the drawings, a first embodiment of a probe cover, generally indicated 10, is shown removed from a shaft 12 of an electronic thermometer probe, generally indicated at 14. The probe 14 includes a temperature sensing tip 15, which may include a metal housing (e.g., aluminum housing) and a sensor (e.g., a thermistor) in the housing. The probe cover 10 comprises a tubular body defining a cavity 16 extending from an open end 18 to a closed end 20 or tip of the body. The cavity 16 is sized and shaped to slidably receive the probe shaft 12 as shown in FIG. 2, and the probe cover 10 is removably attachable to the probe 14. In the illustrated embodiment, the body of the probe cover 10 has an outer diameter OD (FIG. 2) that tapers toward the closed end 20 of the body. Moreover, a thickness T (FIG. 2) of the body also tapers from generally adjacent the closed end 20 toward the closed end.

Figure 1:
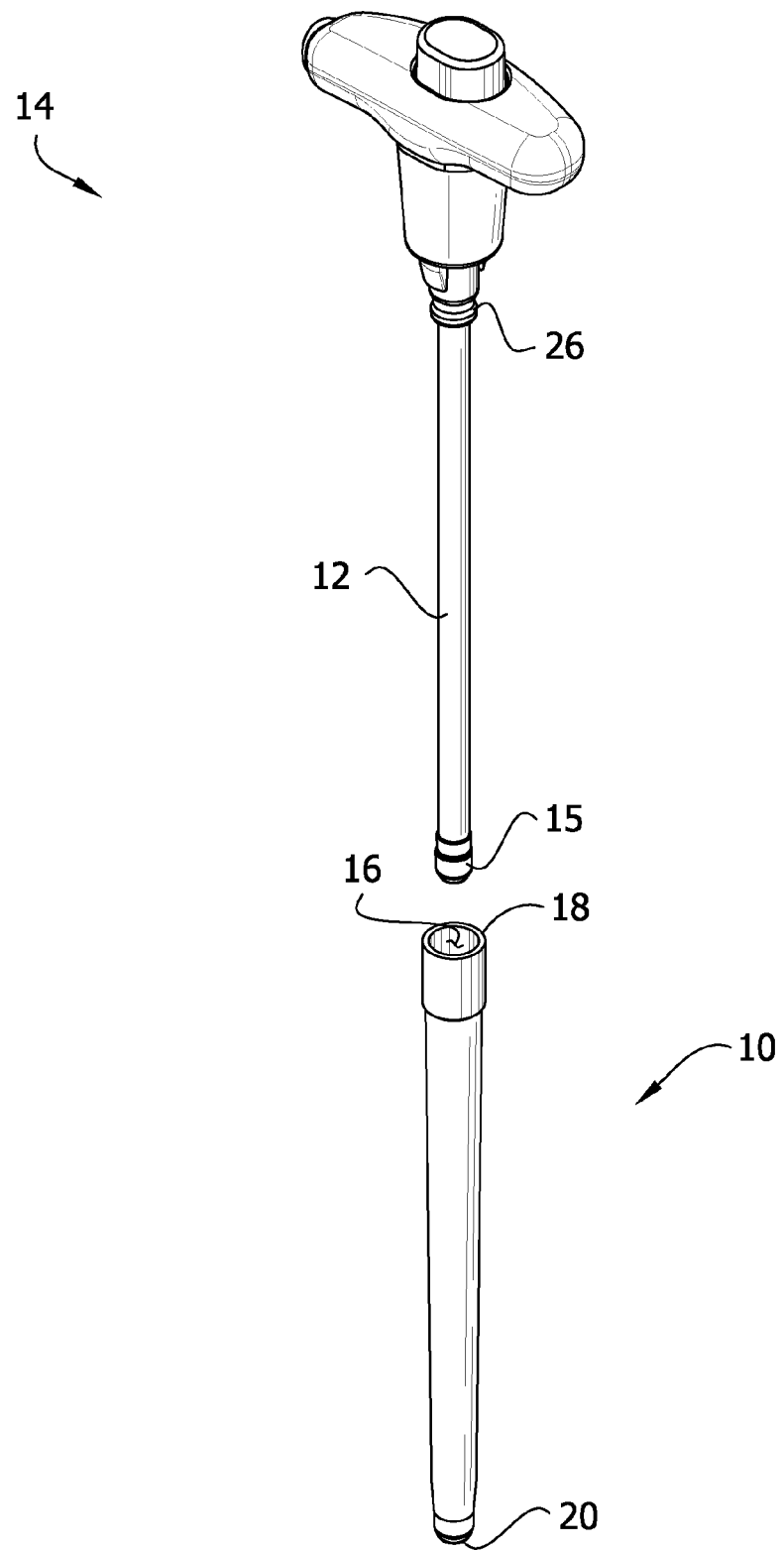
FIG. 1 is a perspective of an electronic thermometer probe and a cover removed from the probe.

In the illustrated embodiment, the probe cover 10 is attachable to the probe 14 by a detachable snap-fit. More specifically, the illustrated probe cover 10 includes an annular, elastically deformable protrusion or bead 24 in the cavity 16 generally adjacent to the open end 18 of the body. The probe 14 includes a generally rigid catch 26 (FIG. 1) defining an annular groove for receiving the bead 24 when the probe cover is fully received on the shaft 12. The probe cover 10 may include other ways of removably attaching the probe cover to the probe 14, including friction-fits and other types of snap-fits, without departing from the scope of the present invention.

A closed end margin 30 of the probe cover 10 is formed from a nanotube composite material comprising a polymer matrix material and a carbon nanotube filler material. The carbon nanotube filler material increases the thermal conductivity of at least the closed end margin 30 of the probe cover 10 so that heat from a source (e.g., a patient's mouth) is more quickly and more efficiently conducted by the cover to the sensing tip 15 of the probe 14. Efficient transfer of heat to the sensing tip 15 of the probe 14 enables faster and more accurate temperature measurements by the thermometer. The end margin 30 is sized to conform to common probe sizes. Probe covers 10 for probes having uncommon sizes may also be fashioned without departing from the scope of the present invention.

In one example, the polymer matrix material of the nanotube composite material may comprise a polymer resin, such as, but not limited to, a thermoplastic polymer or thermoset polymer. By way of example, the polymer matrix material may include polyethylene (PE), polypropylene (PP), polycarbonate (PC), polystyrene (PS), poly ethylene terephthalate (PET), and poly vinyl chloride (PVC). Moreover, in one example the carbon nanotube filler material in the nanotube composite material may comprise a plurality of single-wall carbon nanotubes. The single-wall carbon nanotubes may vary in diameter and length. The average diameter of the single-wall carbon nanotubes may be about 1.2 nm. The carbon nanotubes may form a porous 3-dimensional network, also known as ropes. In one example, the average spacing between the carbon nanotubes, such as single-wall nanotubes themselves or single-wall carbon nanotube ropes in the nanotube composite, is not more than about 300 nanometers. The thermal conductivity of the nanotube composite may vary without departing from the scope of the present invention. Optimizing desired properties such as thermal conductivity by choosing design variables such as the percent of carbon nanotubes are well within the abilities of those skilled in the art.

In a first embodiment (FIG. 2), only the closed end margin 30 of the probe cover 10 is formed from the nanotube composite material polymer matrix material and a carbon nanotube filler material. In this embodiment, the remainder of the probe cover 10 aside from the closed end margin 30 is formed from a material that does not include carbon nanotube filler material. For example, at least a majority, and preferably substantially an entirety, of the remainder of the probe cover 10 comprises a polymer resin, such as, but not limited to, a thermoplastic polymer or thermoset polymer. In one example, the remainder of the probe cover may be formed from the same polymer resin that makes up the polymer matrix material of the nanotube composite material.

An exemplary method of making the first embodiment of the probe cover 10 includes molding the closed end margin 30 of the probe cover separately from molding the remainder of the probe cover. As an example, the remainder of the probe cover 10, apart from the closed end margin 30, may be extruded as a tube or formed by molding. Other ways of forming the remainder of the probe cover 10 do not depart from the scope of the present invention. Also as an example, to form the closed end margin 30 of the probe cover 10, a selected amount (i.e., weight percent) of carbon nanotubes are mixed into a batch of heated polymer resin to generally evenly disperse the nanotubes in the resin. The mixed resin and nanotubes are then molded, such as by injection molding or compression molding, and cured to form the closed end margin 30 of the probe cover 10. The closed end margin 30 may be formed in other ways without departing from the scope of the present invention. To complete the probe cover 10, the closed end margin 30 is attached to the remainder of the probe cover. The closed end margin 30 and the remainder of the prove cover 10 may be attached by adhesive or the two parts may be attached by a two-step molding process where one part is attached to an already formed part as one or both of the parts is molded. The probe cover 10 having only its closed end margin 30 formed of the nanotube composite material may be formed in other ways without departing from the scope of the present invention.

In a second embodiment, substantially an entirety of the probe cover 10 is formed from the nanotube composite material. In this embodiment, the probe cover 10 may be formed using a one-step molding process. For example, a selected amount of carbon nanotubes is mixed into a batch of heated polymer resin to generally evenly disperse the nanotubes in the resin. The mixed resin and nanotubes are then molded, such as by injection molding or compression molding, and then cured to form the probe cover 10. The second embodiment of the probe cover 10 may be formed in other ways without departing from the scope of the present invention.

In a third embodiment, at least the closed end margin 30 of the probe cover 10 is formed from the nanotube composite material and at least the closed end margin is coated with a graphite material 36. In the illustrated embodiment, only the closed end margin 30 of the probe cover 10 is formed from the nanotube composite material and only the closed end margin has a graphite coating 36. It is understood that substantially an entirety of the probe cover 10 may be coated with graphite 36 without departing from the scope of the present invention. The graphite coating 36 may have various thicknesses without departing from the scope of the present invention. Selecting a thickness for optimizing desired properties is well within the skill of ordinary artisans.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of making a cover for a shaft of an electronic thermometer probe comprising:
    preparing a polymer resin;
    introducing carbon nanotubes into the polymer resin;
    mixing the nanotubes and polymer resin to generally evenly disperse the nanotubes in the resin;
    molding the mixed resin and nanotubes;
    curing the mixed resin and nanotubes; and
    forming at least a portion of a cover for a shaft of an electronic thermometer probe from the cured resin and nanotubes mixture.

2. A method as set forth in claim 1 further comprising coating the cured resin and nanotubes with graphite.

* * * * *